(12) United States Patent
Berry et al.

(10) Patent No.: US 8,281,231 B2
(45) Date of Patent: Oct. 2, 2012

(54) TIMELINE ALIGNMENT FOR CLOSED-CAPTION TEXT USING SPEECH RECOGNITION TRANSCRIPTS

(75) Inventors: Matthew G. Berry, Raleigh, NC (US); Changwen Yang, Morrisville, NC (US)

(73) Assignee: Digitalsmiths, Inc., Durham, NC (US)

( * ) Notice: Subject to any disclaimer, the term of this patent is extended or adjusted under 35 U.S.C. 154(b) by 171 days.

(21) Appl. No.: 12/881,026

(22) Filed: Sep. 13, 2010

(65) Prior Publication Data

US 2011/0134321 A1 Jun. 9, 2011

Related U.S. Application Data

(60) Provisional application No. 61/241,450, filed on Sep. 11, 2009.

(51) Int. Cl.
*G06F 17/00* (2006.01)

(52) U.S. Cl. .................................................. 715/201

(58) Field of Classification Search .................. 715/201, 715/203, 256
See application file for complete search history.

(56) References Cited

U.S. PATENT DOCUMENTS

| | | | | |
|---|---|---|---|---|
| 5,537,151 | A * | 7/1996 | Orr et al. ........................ | 348/564 |
| 5,703,655 | A * | 12/1997 | Corey et al. .................... | 348/468 |
| 5,741,136 | A * | 4/1998 | Kirksey et al. ................. | 434/169 |
| 5,835,667 | A * | 11/1998 | Wactlar et al. ................. | 386/241 |
| 6,029,195 | A * | 2/2000 | Herz .............................. | 725/116 |
| 6,076,059 | A * | 6/2000 | Glickman et al. ............. | 704/260 |
| 6,166,780 | A * | 12/2000 | Bray .............................. | 348/632 |
| 6,400,996 | B1 * | 6/2002 | Hoffberg et al. ............... | 700/83 |
| 6,542,200 | B1 * | 4/2003 | Barcy et al. .................... | 348/468 |
| 7,013,273 | B2 * | 3/2006 | Kahn .............................. | 704/235 |
| 7,221,405 | B2 * | 5/2007 | Basson et al. ................. | 348/468 |
| 7,330,640 | B2 * | 2/2008 | Schultz et al. ................. | 386/343 |
| 7,421,477 | B2 * | 9/2008 | Pettinato ........................ | 709/207 |
| 7,765,574 | B1 * | 7/2010 | Maybury et al. ............... | 725/105 |
| 7,877,774 | B1 * | 1/2011 | Basso et al. .................... | 725/44 |
| 2003/0065503 | A1 * | 4/2003 | Agnihotri et al. .............. | 704/7 |
| 2008/0208589 | A1 * | 8/2008 | Cross et al. ..................... | 704/275 |
| 2008/0284910 | A1 * | 11/2008 | Erskine et al. ................. | 348/468 |
| 2010/0121638 | A1 * | 5/2010 | Pinson et al. ................... | 704/235 |
| 2010/0332225 | A1 * | 12/2010 | Arrowood et al. ............. | 704/235 |

OTHER PUBLICATIONS

Gupta, Sonal, et al, Using Closed Caption to Train Activity Recognizers That Improve Video Retrieval: Department of Computer Sciences, The University of Texas at Austin, 2009, IEEE, 978-1-4244-3793-5, pp. 30-37.*

(Continued)

*Primary Examiner* — Laurie Ries
(74) *Attorney, Agent, or Firm* — John L. Sotomayor

(57) ABSTRACT

Method, systems, and computer program products for synchronizing text with audio in a multimedia file, wherein the multimedia file is defined by a timeline having a start point and end point and respective points in time therebetween, wherein an N-gram analysis is used to compare each word of a closed-captioned text associated with the multimedia file with words generated by an automated speech recognition (ASR) analysis of the audio of the multimedia file to create an accurate, time-based metadata file in which each closed-captioned word is associated with a respective point on the timeline corresponding to the same point in time on the timeline in which the word is actually spoken in the audio and occurs within the video.

20 Claims, 4 Drawing Sheets

OTHER PUBLICATIONS

Wakao, Takahiro, et al, Application of Natural Language Processing and Speech Processing Techology to Production of Closed-Caption Tv Programs for the Hearing Impaired:, NHK Science and Technical Research Labs, pp. 1-6, 1998, COLING '98, Proceedings of the 17$^{th}$ International Conference on Computational Linguistics, vol. 2.*

Takahashi, Shinya, et al, "Automatic Closed-Caption Alignment Using Pronunciation of Speech Recognition Transcripts for Public Relations TV Program", Proceedings of the International MultiConference of Engineers and Computer Scientists, 2008, vol. 1, pp. 1-5.*

Huang, Chih-wei, "Automatic Closed Caption Alignment Based on Speech Recognition Transcripts", Columbia Technical Report 005, 2003, pp. 1-14.*

Jang, Photina Jaeyun, et al, "Improving Acoustic Models with Captioned Multimedia Speech", Computer Science Department, Carnegie Mellon University, pp. 767-771, 1999, IEEE.*

Gibbon, David C., "Generating Hypermedia Documents from Transcriptions of Television Programs Using Parallel Text Alignment", AT&T Labs—Research, IEEE Eighth International Workshop on Research Issues in Data Engineering (RIDE), 1998, pp. 1-8.*

* cited by examiner

TIMELINE ALIGNMENT FOR CLOSED-CAPTION TEXT USING SPEECH RECOGNITION TRANSCRIPTS

CROSS REFERENCE TO RELATED APPLICATION

This application claims the benefit under 35 U.S.C. §119 (e) of U.S. Provisional Patent Application Ser. No. 61/241,450, entitled "Timeline Alignment for Closed-Captions Using Speech Recognition Transcripts," filed Sep. 11, 2009, which is incorporated herein by reference as if set forth herein in its entirety.

FIELD OF THE PRESENT INVENTION

The present invention relates generally to video and associated audio transcripts and closed-captioned text, and, more particularly, to methods and systems for automatically and correctly aligning the timeline of audio transcripts with corresponding video for indexing, accurate metadata capture and usage, and for improved searching and playback presentation purposes.

BACKGROUND OF THE PRESENT INVENTION

Closed captioning is a term describing several systems developed to display text on a television or video screen to provide additional or interpretive information to viewers who wish to access it. Closed captions typically display a transcript of the audio portion of a program as it occurs (either verbatim or in edited form), sometimes including non-speech elements. Most commonly, closed captions are used by deaf or hard of hearing individuals to assist comprehension. However, audio transcripts associated with video are also an important tool used for creating indexes or underlying metadata associated with video that can be used for many different purposes.

When indexing and associating metadata with videos, it is very important that the video and audio be correctly and closely aligned in order for the underlying metadata of each frame or scene of the video to match up correctly. Unfortunately, audio transcripts obtained from known sources, like human generated closed-captions or automated speech recognition (ASR) software, almost always introduce time lags. It has been observed in the industry, with production level data, that typical time lags associated with closed caption text, while often accurate, can cause audio transcripts to shift as much as 30 seconds or more with respect to the corresponding visuals. Such time lags introduce errors in time-based indexing and can create errors in the underlying metadata associated with a video—especially if the timeline of the audio transcript is relied upon and assumed to synch correctly with the timeline of the actual audio.

On the other hand, automated speech recognition (ASR) software, when used alone to try to generate an audio transcript of a corresponding video, usually captures the correct timeline and time location for each word or sound associated with the video, but ASR software still generates a number of errors in transcription and tends to miss some text, especially when there is a lot of background noise.

For these and many other reasons, there is a need for systems and methods that correctly and accurately calibrate the timeline for audio transcripts with the underlying audio and video, which improves not only the underlying metadata created by video indexing systems, but also provides an improved and automated system for synching closed-captioned text with the actual audio and corresponding video for later playback and use.

It will be understood that the present methods may also include and encompass computer-readable media having computer-executable instructions for performing steps or functions of the methods described herein and that the systems described herein may include computer networks and other systems capable of implementing such methods.

The above features as well as additional features and aspects of the present invention are disclosed herein and will become apparent from the following description of preferred embodiments of the present invention.

SUMMARY OF THE PRESENT INVENTION

The present invention relates generally to video and associated audio transcripts and closed-captioned text, and, more particularly, to methods and systems for automatically and correctly aligning the timeline of each word of an audio transcript with a specific point in time of corresponding video for indexing, accurate metadata capture and usage, for improved searching and playback presentation, and for numerous other purposes. Briefly described, aspects of the present invention include the following.

In a first aspect of the present invention, a method of synchronizing text with audio in a multimedia file is disclosed and described, wherein the multimedia file includes previously synchronized video and audio, wherein the multimedia file has a start time and a stop time that defines a timeline for the multimedia file, wherein the frames of the video and the corresponding audio are each associated with respective points in time along the timeline, comprising the steps of: receiving the multimedia file and parsing the audio therefrom, but maintaining the timeline synchronization between the video and the audio; receiving closed-captioned data associated with the multimedia file, wherein the closed-captioned data contains closed-captioned text, wherein each word of the closed-captioned text is associated with a corresponding word spoken in the audio, wherein each word of the closed-captioned text has a high degree of accuracy with the corresponding word spoken in the audio but a low correlation with the respective point in time along the timeline at which the corresponding word was spoken in the audio; using automated speech recognition (ASR) software, generating ASR text of the parsed audio, wherein each word of the ASR text is associated approximately with the corresponding words spoken in the audio, wherein each word of the ASR text has a lower degree of accuracy with the corresponding words spoken in the audio than the respective words of the closed-captioned text but a high correlation with the respective point in time along the timeline at which the corresponding word was spoken in the audio; thereafter, using N-gram analysis, comparing each word of the closed-captioned text with a plurality of words of the ASR text until a match is found; and for each matched word from the closed-captioned text, associating therewith the respective point in time along the timeline of the matched word from the ASR text corresponding therewith, whereby each closed-captioned word is associated with a respective point on the timeline corresponding to the same point in time on the timeline in which the word is actually spoken in the audio and occurs within the video.

In a feature, the closed-captioned text and the ASR text represent only a portion of the audio of the multimedia file. In another feature, the closed-captioned text and the ASR text represent all of the audio of the multimedia file.

In another feature, the step of comparing each word of the closed-captioned text with a plurality of words of the ASR text until a match is found further comprises the step of moving on to the next respective word of the closed-captioned text for comparison purposes if the prior word of the closed-captioned text is not matched with any of the plurality of words of the ASR text.

In yet a further feature, for any unmatched word in the closed captioned text, identifying the closest matched words in the closed captioned text on either side of the unmatched word along the timeline and then comparing the unmatched word with words of the ASR text between the two points on the timeline and selecting the most likely match or matches thereto.

In another feature, the step of comparing comprises matching strings of characters between the words of the closed-captioned text with the words of the ASR text to attempt to find exact or phonetically similar matches.

In a further feature, the step of comparing comprises matching strings of characters between the words of the closed-captioned text with the words of the ASR text to attempt to find approximate matches based on the proximity of the respective points on the timeline of the respective words.

In another feature, N represents the number of words to be analyzed.

In yet a further feature of the first aspect of the present invention, the method further comprises the step of creating a time-based metadata file that contains all of the correct words associated with the audio of the multimedia file and wherein each of the correct words is associated with the respective point in time along the timeline of the matched word from the ASR text corresponding therewith. Preferably, the time-based metadata file is associated with the corresponding multimedia file.

In a second aspect of the present invention, a computer program product, comprising a computer readable medium; and computer program instructions stored on the computer readable medium that, when processed by a computer, instruct the computer to perform a process of synchronizing text with audio in a multimedia file is disclosed and described, wherein the multimedia file includes previously synchronized video and audio, wherein the multimedia file has a start time and a stop time that defines a timeline for the multimedia file, wherein the frames of the video and the corresponding audio are each associated with respective points in time along the timeline, the process comprising: receiving the multimedia file and parsing the audio therefrom, but maintaining the timeline synchronization between the video and the audio; receiving closed-captioned data associated with the multimedia file, wherein the closed-captioned data contains closed-captioned text, wherein each word of the closed-captioned text is associated with a corresponding word spoken in the audio, wherein each word of the closed-captioned text has a high degree of accuracy with the corresponding word spoken in the audio but a low correlation with the respective point in time along the timeline at which the corresponding word was spoken in the audio; using automated speech recognition (ASR) software, generating ASR text of the parsed audio, wherein each word of the ASR text is associated approximately with the corresponding words spoken in the audio, wherein each word of the ASR text has a lower degree of accuracy with the corresponding words spoken in the audio than the respective words of the closed-captioned text but a high correlation with the respective point in time along the timeline at which the corresponding word was spoken in the audio; thereafter, using N-gram analysis, comparing each word of the closed-captioned text with a plurality of words of the ASR text until a match is found; and for each matched word from the closed-captioned text, associating therewith the respective point in time along the timeline of the matched word from the ASR text corresponding therewith, whereby each closed-captioned word is associated with a respective point on the timeline corresponding to the same point in time on the timeline in which the word is actually spoken in the audio and occurs within the video.

In a feature, the closed-captioned text and the ASR text represent only a portion of the audio of the multimedia file. In another feature, the closed-captioned text and the ASR text represent all of the audio of the multimedia file.

In another feature, within the process, the step of comparing each word of the closed-captioned text with a plurality of words of the ASR text until a match is found further comprises the step of moving on to the next respective word of the closed-captioned text for comparison purposes if the prior word of the closed-captioned text is not matched with any of the plurality of words of the ASR text.

In yet a further feature, for any unmatched word in the closed captioned text, the process further comprises identifying the closest matched words in the closed captioned text on either side of the unmatched word along the timeline and then comparing the unmatched word with words of the ASR text between the two points on the timeline and selecting the most likely match or matches thereto.

In another feature of this second aspect of the invention, within the process, the step of comparing comprises matching strings of characters between the words of the closed-captioned text with the words of the ASR text to attempt to find exact or phonetically similar matches.

In a further feature, within the process, the step of comparing comprises matching strings of characters between the words of the closed-captioned text with the words of the ASR text to attempt to find approximate matches based on the proximity of the respective points on the timeline of the respective words.

In another feature, N represents the number of words to be analyzed by the process.

In a further feature, the process further comprises creating a time-based metadata file that contains all of the correct words associated with the audio of the multimedia file and wherein each of the correct words is associated with the respective point in time along the timeline of the matched word from the ASR text corresponding therewith.

In another feature, the process further comprises associating the time-based metadata file with the corresponding multimedia file.

It will be understood by those skilled in the art that the present methods and systems and computer program product may also include and encompass computer-readable media having computer-executable instructions for performing steps or functions of the methods described herein and that the systems described herein may include computer networks and other systems capable of implementing such methods.

The above features as well as additional features and aspects of the present invention are disclosed herein and will become apparent from the following description of preferred embodiments of the present invention.

BRIEF DESCRIPTION OF THE DRAWINGS

Further features and benefits of the systems and methods described herein will be or will become apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
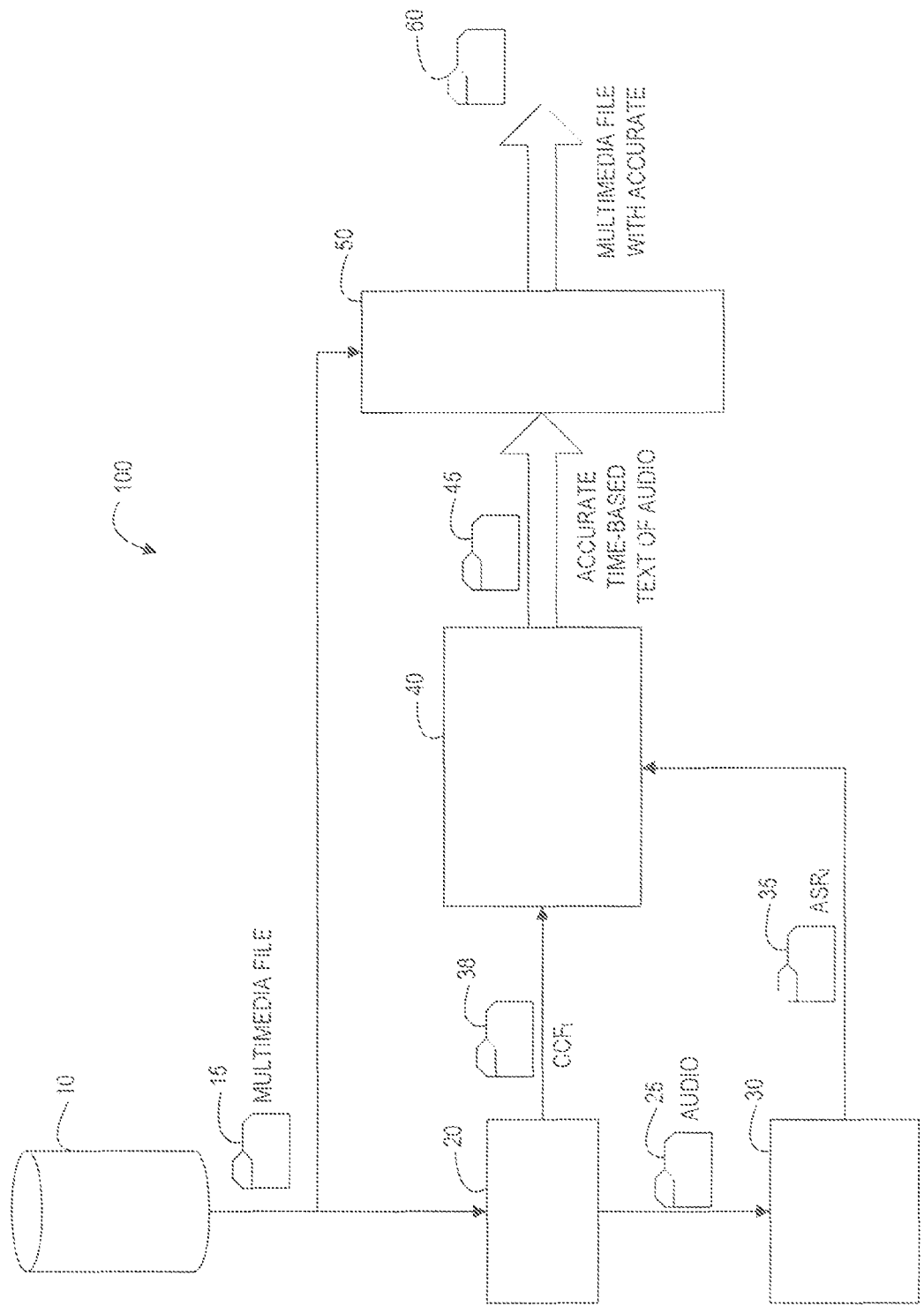
FIG. 1 is a system view of the preferred embodiment of the present invention.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one of ordinary skill in the art to which the disclosure relates.

The present system and methods calibrate the timeline of human speech obtained from audio tracks of a video to correctly follow the timeline of the visual frames and scenes while, at the same time, maintaining a high level of quality associated with the transcription. The human speech for the audio tracks is generally available from two sources: (i) automated speech recognition (ASR) software and (ii) closed-captions (CC) created manually by human interpreters. Unfortunately, neither of the two sources by itself typically provides a successful or reliable method to align an accurate audio transcription with the video on a precise timeline basis. This creates issues with indexing and the accurate creation of time-based metadata associated with specific frames and scenes within a video, which relies upon and requires more precise synchronization of the audio and the video with the underlying timeline of the multimedia matter, such as a movie or TV show.

While ASR is able to capture the timeline accurately with respect to the visuals (assuming that the audio is correctly synched with the video, which is typically the case with any high quality multimedia matter), its failure rate to recognize or spell words correctly is very high. On the other hand, closed-captions tend to capture the words correctly, but frequently shift them from the time they were actually spoken since proper synching of the text may not be possible or important in typical use of closed-captioning. For example, it may be more desirable to slow down the typical closed captioned text long enough for it to be read more easily, and it may be less important for the written text to match up precisely with the visually spoken words. Further, closed caption text is typically grouped together as a block of text that is associated with a particular scene or between a start time and an end time of the underlying video. Rarely are closed captions presented in a format that precisely matches each word of text presented on screen with the spoken (or sung) word and underlying video—other than in specific applications, such as karaoke videos. Introduction of ad-breaks inside videos is another reason why audio transcripts are or need to be shifted. The present systems and methods are used for traditional closed captioned text that are associated with a block of video or a scene and where there is no need or reason for the text to be synched precisely with the underlying audio and, at times, where it may be preferable for them not to be so precisely aligned so that the text may be more easily read by the viewer.

As described herein, the present methods and systems adjust and align the timeline of text within a video by comparing closed captioned words against the text output of ASR speech software run against the same video, using an N-gram model algorithm for matching strings. The systems and methods, thus, enable identifying correct text and identifying the precise point in time that such text occurs as audio within the synched video. An N-gram is a subsequence of N items from a given sequence of words. In this case, the sequence of words is ASR-generated audio transcriptions from videos. Typically, an N-gram model is a type of probabilistic model for predicting the next item in the sequence. Here, an N-gram model was used by placing an input pattern over another text piece at its extreme left and scanned to the right for a mismatch. If a mismatch occurs, the input pattern is shifted one position to the right and the scan is restarted at the leftmost position of the pattern. This process is repeated until a match occurs or the end of the input pattern is reached.

FIG. 1 illustrates a preferred embodiment of the system 100 of the present invention. System 100 includes a multimedia database 10, which contains one or more multimedia files for analysis and processing as described herein. A multimedia file 15 preferably includes video and audio, typically synchronized with each other in conventional manner so that the audio is synchronized with the corresponding video so that, for example, the audio of a person speaking matches the movement of the person's lips. Preferably, the multimedia file has a start time (St) and an end (or stop) time (Et), the range of which defines a timeline for the multimedia file 15. Typically, each frame of the video, and its corresponding audio, are each associated with respective points in time along that timeline. The file 15 preferably also includes a closed-captioned file (CCF) or closed-caption data associated with the audio and video, which includes closed-captioned text 38 that corresponds with the audio of the multimedia file 15. Typically, the CCF is appended as a track of the multimedia file; however, the CCF could just as easily be a separate file that is merely associated with the multimedia file 15 and available upon request. As will be appreciated by those skilled in the art, the CCF or closed-captioned data contains closed-captioned text 38, wherein each word of the closed-captioned text is associated with a corresponding word spoken in the audio. It will also be understood that each word of the closed-captioned text tends to have a high degree of accuracy with the corresponding word or words spoken in the audio, but a low correlation with the respective point in time along the timeline at which the corresponding word was spoken in the audio.

The system 100 also includes a parser 20 that is adapted to receive the multimedia file 15 and forward the audio portion 25 of the multimedia file 15 on to an automated speech recognition (ASR) module, component, or software system 30. As will be appreciated, the timeline or synchronization between the audio and the video is not lost as part of this parsing or, in other words, the synchronization of the audio with the video is maintained. The output of the ASR component 30 is ASR text 35. As will be appreciated by those skilled in the art, each word of the ASR text 35 is associated approximately with the corresponding word or words spoken in the audio, wherein each word of the ASR text 35 has a lower degree of accuracy with the corresponding word or words spoken in the audio than the respective word of the closed-captioned text 38 but has a high correlation with the respective point in time along the timeline at which the corresponding word was spoken in the audio.

The closed-caption text 38 and the ASR text 35 are each provided to a synchronization comparator component 40. As will be described in greater detail hereinafter, the synchronization comparator component 40 compares the closed-caption text 38 and the ASR text 35 in order to generate, as an output 45, the best possible version of the text that matches the audio word for word (generally based upon the closed-captioned text 38) and wherein each word is associated with the accurate point on the timeline corresponding to the same point in time on the timeline in which the word is actually spoken in the audio and occurs within the video.

The accurate, time-based text output 45 is then provided to a re-combiner or re-association component 50 along with the original multimedia file 15 so that an accurate multimedia file with the accurate, time-based text is now available for further use. The accurate, time-based text output 45 is a type of metadata associated with the multimedia file 15. Such metadata may be linked into a single file output 60 that may optionally be provided back to the database 10 for later use. In alternative embodiments (not shown), the accurate, time-based text output 45 may be provided back to the database 10 and associated with the original multimedia file 15 or may be provided to a different database or to a software module that uses the metadata for searching, analysis, or other processing.

Figure 2:
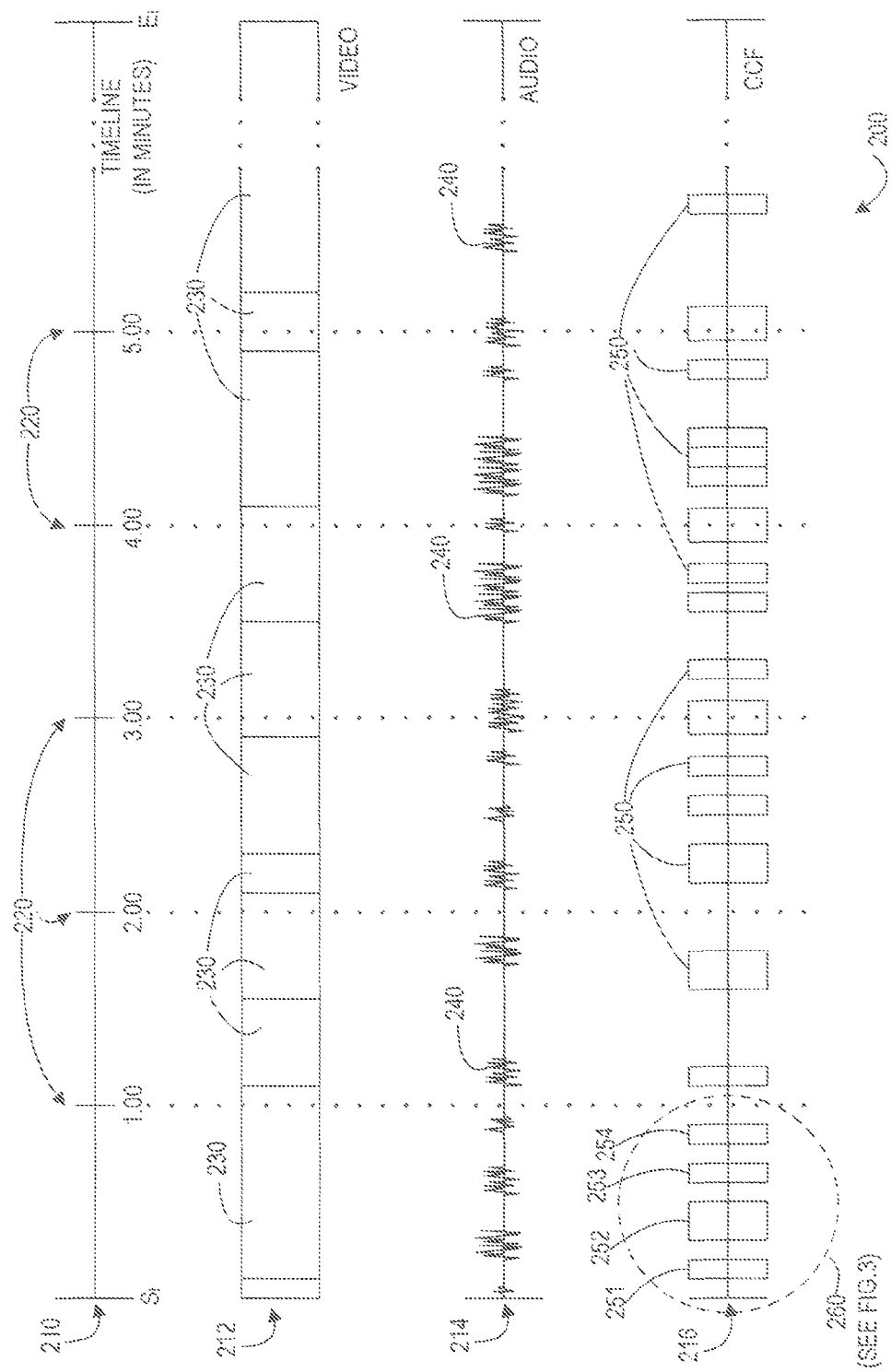
FIG. 2 is an exemplary timeline for a multimedia file as described in FIG. 1.

Turning now to FIG. 2, an exemplary timeline 200 for a multimedia file, as described in FIG. 1, is illustrated. The timeline 200 of the multimedia file is represented by a plurality of variable-specific sub-timelines 210, 212, 214, and 216 that are shown one above the other and are assumed to be synchronized/aligned. Sub-timeline 210 is the "main" timeline of the multimedia file and represents the time-based variable associated with the multimedia file. The sub-timeline 210 includes a start time (St) and an end (or stop) time (Et) and is divided into time increments 220. In this example and at the shown resolution, sub-timeline 210 is arbitrarily divided into one (1) minute time increments. As will be appreciated, one could zoom into the sub-timeline 210 and focus on sub-one-minute time increments or, conversely, could zoom out and focus on greater than one minute time increments.

Sub-timeline 212 represents the video component portion of the multimedia file and is divided into a plurality of scenes or camera-shot segments 230 separated by dividers. Sub-timeline 214 represents the audio component portion of the multimedia file wherein the audio is shown as an analog wave form 240 with an amplitude (positive or negative) indicative of the occurrence some form of sound (noise, music, dialogue, etc) occurring during the video and with zero amplitude shown when there is silence on the audio file. Again, it is assumed that the video and audio are synchronized with each other and with the main timeline. In some embodiments, the audio file and sub-timeline 214 may be limited to just the dialogue portion of the audio of the multimedia file, with other non-dialogue sounds being separated out onto their own sub-timelines (not shown). Finally, sub-timeline 216 represents the closed-captioned text associated with the multimedia file. The closed-captioned text is represented as a series of blocks 250 in which each block represents one or more words that are displayed on-screen of the video starting at the point of time on the timeline at the leftmost side of the block. In some embodiments of use of closed-captioning, the text remains on screen until the next block of text takes its place. In other embodiments, as contemplated and shown in FIG. 2, the block of text is assumed to stay on screen until the point in time represented by the rightmost edge of the respective block. Regardless, it is impossible, solely by examining the closed-captioning time block 250, to determine when each word within a respective closed-captioning block matches up at an exact point in time on the timeline with the same words actually spoken in the audio. Such words can be approximately, but not precisely matched with a point in time. Blow-up 260 focuses on a portion of the closed-captioned text of sub-timeline 216 and is discussed in greater detail in FIG. 3.

Figure 3:
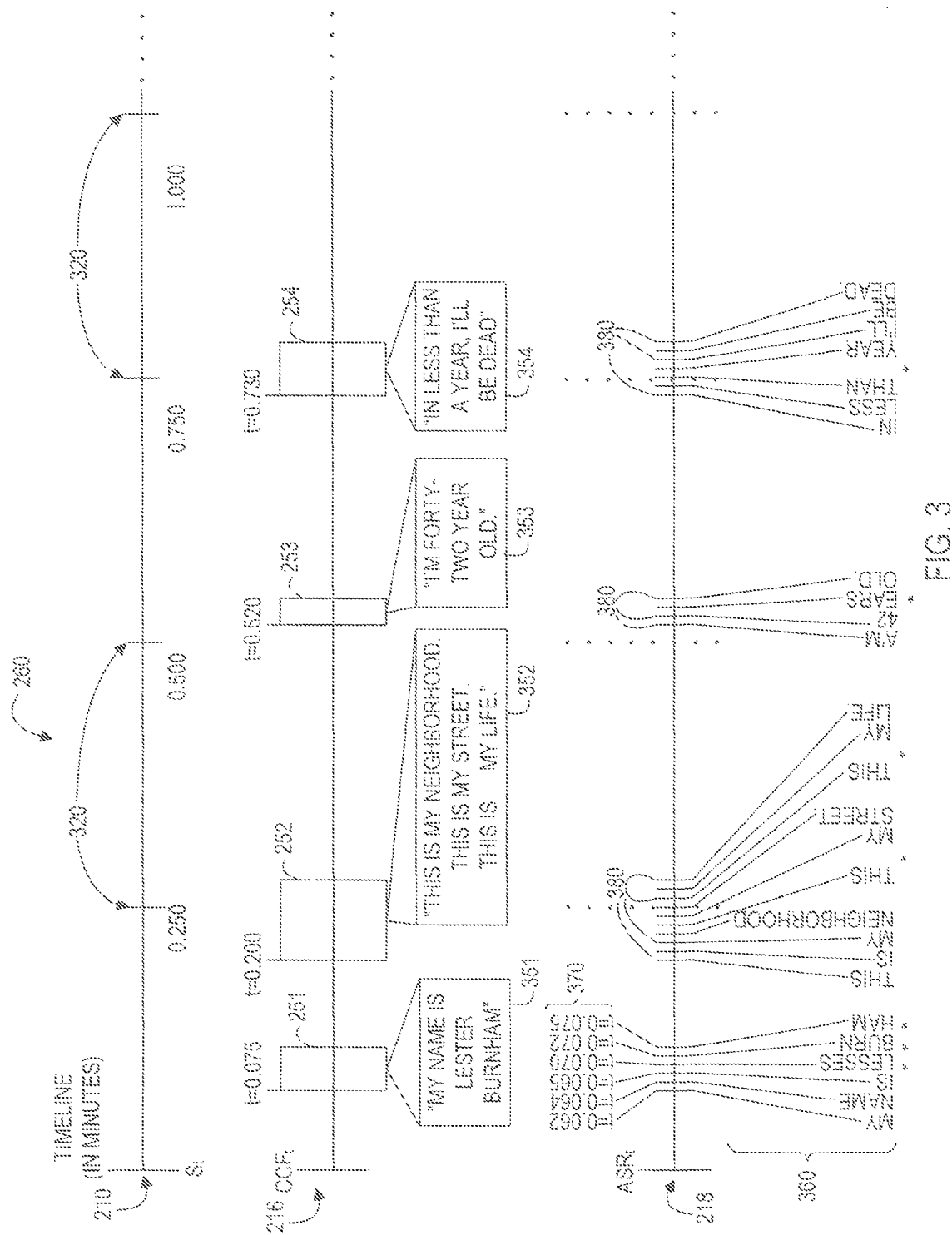
FIG. 3 is a blow-up view of a portion of the timeline of FIG. 2.

Turning now to FIG. 3, a zoomed in portion 260 of the exemplary timeline 200 for the multimedia file, as described in FIG. 2, is illustrated. Sub-timeline 210 is still representative of the "main" timeline of the multimedia file and represents the time-based variable associated with the multimedia file. The sub-timeline 210 includes a start time (St) and, in this example and at the shown blown-up resolution, only focuses on the first one (1) minute of the multimedia file and is arbitrarily divided into 0.25 (one quarter) minute time increments 320. The blown-up portion of sub-timeline 216 from FIG. 2 still represents the closed-captioned text associated with the multimedia file wherein blocks 251, 252, 253, and 254 represent the four closed-captioned blocks that occur in the first minute of the video. Block 251 is shown to start at time t=0.075 and includes the text 351 ("My name is Lester Burnham."). Block 252 is shown to start at time t=0.310 and includes the text 352 ("This is my neighborhood. This is my street. This . . . is my life."). Block 253 is shown to start at time t=0.732 and includes the text 353 ("I'm forty-two years old."). Block 254 is shown to start at time t=0.890 and includes the text 354 ("In less than a year, I'll be dead."). A blown-up portion of sub-timeline 218 (not shown in FIG. 2) represents the ASR text generated by the ASR component 30 from FIG. 1. Each ASR text 360 represents a word and has a corresponding time 370 shown as specific points in time 380 along the timeline 218. As can be seen, the ASR text 360 is close, but does not perfectly match up word for word with the closed-captioned text 351-354. However, as described herein, the closed-captioned text 351-354 represents the most accurate text corresponding with the dialogue portion of the audio or the multimedia file. Further, the ASR text 360 provides the most accurate time points 370 associated with each word. The system and processes described above and hereinafter, create the accurate, time-based text by comparing and taking the most accurate information from these two sources of data.

Figure 4:
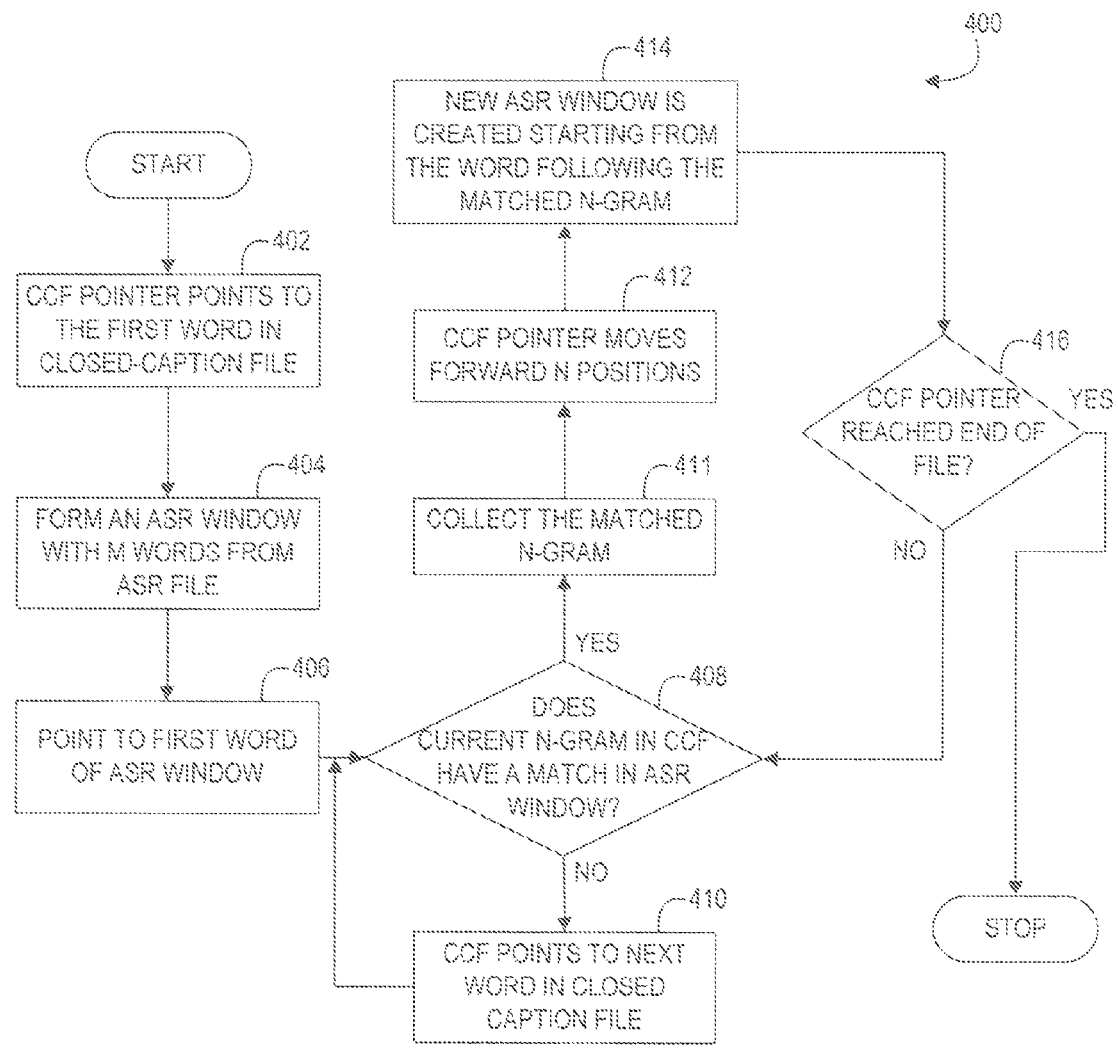
FIG. 4 is a flow chart of a preferred method of the present invention.

FIG. 4 illustrates the steps of the process 400 described herein by which the closed-captioned text and ASR text are analyzed to generate the accurate, time-based text that matches up the words of dialogue accurately with the time at which such words are actually spoken in the underlying multimedia file. The two different streams of text used by the process are obtained (i) from the ASR component 30 and (ii) from the closed-caption files or data 38 associated with the corresponding multimedia file 15. For purposes of testing and analysis, the ASR component 30 comprised a currently, and readily-available, commercial version of IBM® "Speech Recognizer" software available in the year 2009.

First, the process 400 assumes that there are $W_C$ words in the closed-caption file and $W_A$ words in the ASR file. Then, a CCF pointer is pointed (step 402) to the first word in the closed-caption file. From the ASR file, starting from the first word, a window with M words is selected (steps 404, 406). The value of M is modifiable and, for purposes of testing of the system by Applicant, was set arbitrarily to 1310. Starting from the word indicated by the CCF pointer, the process 400 then looks for an N-gram match within the ASR window (step 408).

If the process cannot find an N-gram matching the first N words in the closed-caption file (if the result of step 408 is a NO), the process then points to the second word in the closed-caption file and repeats the N-gram matching process (step 410). The ASR window remains unchanged until a match is found, i.e., the ASR window of size M will still point to the first word of the ASR file (at step 406). If the process finds an N-gram within the ASR window matching the first N word in the closed-caption file (at step 408), the N word of the closed-captioned file is deemed a match and the time associated with the matching ASR text word is assigned to the N word and such N word and corresponding time is included in the accurate, time-based text file (step 411). The process then will point to the N+1$^{th}$ position in the closed-caption file (step 412). The ASR window is then updated to form a new window of size M starting from the next word following the current N-gram (step 414). The process will continue until all $W_C$ words in the closed-caption file have been compared against the ASR file (step 416).

The following example illustrates how the words in the closed caption file are aligned based on the timeline of the ASR file. The two lines shown below are an example of an extracted N-gram, where N=5. The first line is from the ASR file and shows word-time pairs. The second line is from the closed-caption file showing the corresponding word-time pairs.

(1) ASR file entry: SPE 5 13 NONE 53.650002 PLUS 54.230000 FIVE 55.160000 BUT 55.639999 YOURS 55.779999 DIS −0.489998

(2) Closed-caption file entry: CAP 33 NONE 54.139999 PLUS 54.709999 FIVE 56.000000 BUT 56.259998 YOURS 56.520000

When the process runs against the above specific 5-gram, (a) the word "NONE" in the closed caption file should be realigned from time 54.139999 to time 53.650002 to match the corresponding word and correct time provided by the ASR file.

Similarly:

(b) the word "PLUS" should be realigned from time 54.709999 to time 54.23

(c) the word "FIVE" should be realigned from time 56.000000 to time 55.16

(d) the word "BUT" should be realigned from time 56.259998 to time 55.639999

(e) the word "YOURS" should be realigned from time 56.52 to time 55.779999

As shown in (a)-(e) above, words inside an N-gram have already been time-aligned by the extracted N-gram. Only words between two extracted N-grams are needed to do time-alignment (including the words before the first N-gram and the words after the last N-gram). Suppose there are t1 (a number) N-gram extracted, these N-grams separate the whole CCF into the following t1+1 parts, and it is necessary to do (t1+1) time alignments.

It is to be noted that the accuracy of the time alignment process strongly depends on the accuracy of the ASR software. For example, during experimentation by Applicant, it was seen that the ASR software used had better recognition for broadcast news programs in the studio, but showed poorer performance when analyzing a typical TV series with background noises. To handle the errors in the ASR, the following processes were used to compute the timelines.

Suppose there T N-grams extracted. Then the closed caption file can be divided into t+1 blocks. The general form each of the T+1 parts is:

| Contents of Block(k + 1) | Description of a line |
|---|---|
| Word[1] Time[1] Time[1][1] | last-word-in-Kth-Ngram(CCF) last-time-in-Kth-Ngram-CCF last-time-in-Kth-Ngram-ASR |
| Word[2] Time[2] | word1-after-Kth-Ngram(CCF) time1-after-Kth-Ngram(CCF) |
| ... | |
| Word[N] Time[N] Time[1][N] | word1-in-Kth-Ngram(CCF) time1-in-Kth-Ngram-CCF time1-in-Kth-Ngram-ASR □ |

In the above scenario, the following formula was used to correct the timelines of erroneous ASR time.

$$time[1]/[x]=time[1][1]+(time[x]-time[1])*(time[1][N]-time[1][1])/(time[N]-time[1])$$

Testing by Applicant showed that this technique provided a solution to achieve very accurate time alignment result when using erroneous ASR obtained from TV series with background noises. The process was tested upon a number of very popular episodes, including "Friends," "Gilmore Girls," "Veronica Mars," and "Smallville."

Specifically, the process was tested using 24 episodes from the series "Friends," 2 episodes from "Gilmore Girls," 3 episodes from "VeronicaMars," and 2 episodes from "Smallville." A total of 31 episodes were used for testing the time alignment system described above.

To verify the results of the time alignment process, the audio from the videos were manually listened to checking the words in the aligned closed-caption every 50 seconds. If the same words appear in the aligned closed-caption file at the same time as the words occurred while listening to the audio, they are counted as correct ones. On the average, each episode lasts about 2500 seconds, only 50 words on the average (on the 50th second, 100th second, 2500th second) were checked. No errors were detected in the experiment results.

In conclusion, precise video indexing requires that the speech transcripts from the audio uses the correct time alignment with respect to the visuals. Lack of proper alignment results in time lags between occurrence of visuals and the transcript, which introduces errors during the video indexing and retrieval process.

The N-gram match process described herein was able to identify matches between closed-captioned files and automated speech recognition transcripts. Even though the automated speech recognition (ASR) transcripts showed high error rates for detecting the correct word spoken in the videos of selected popular TV series that had background noise, the above described process showed very high accuracy in aligning the time of words in the closed-captioned files. Best performance for the present system was obtained by running the software and comparison processes on a Linux® machine.

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A method of synchronizing text with audio in a multimedia file, wherein the multimedia file includes previously synchronized video and audio, wherein the multimedia file has a start time and a stop time that defines a timeline for the multimedia file, wherein the frames of the video and the corresponding audio are each associated with respective points in time along the timeline, comprising the steps of:
   receiving the multimedia file and parsing the audio therefrom, but maintaining the timeline synchronization between the video and the audio;
   receiving closed-captioned data associated with the multimedia file, wherein the closed-captioned data contains closed-captioned text, wherein each word of the closed-captioned text is associated with a corresponding word spoken in the audio, wherein each word of the closed-captioned text has a high degree of accuracy with the corresponding word spoken in the audio but a low correlation with the respective point in time along the timeline at which the corresponding word was spoken in the audio;
   using automated speech recognition (ASR) software, generating ASR text of the parsed audio, wherein each word of the ASR text is associated approximately with the corresponding words spoken in the audio, wherein each word of the ASR text has a lower degree of accuracy with the corresponding words spoken in the audio than the respective words of the closed-captioned text but a high correlation with the respective point in time along the timeline at which the corresponding word was spoken in the audio;
   thereafter, using N-gram analysis, comparing each word of the closed-captioned text with a plurality of words of the ASR text until a match is found;
   for each matched word from the closed-captioned text, associating therewith the respective point in time along the timeline of the matched word from the ASR text corresponding therewith, whereby each closed-captioned word is associated with a respective point on the timeline corresponding to the same point in time on the timeline in which the word is actually spoken in the audio and occurs within the video.

2. The method of claim 1 wherein the closed-captioned text and the ASR text represent only a portion of the audio of the multimedia file.

3. The method of claim 1 wherein the closed-captioned text and the ASR text represent all of the audio of the multimedia file.

4. The method of claim 1 wherein the step of comparing each word of the closed-captioned text with a plurality of words of the ASR text until a match is found further comprises the step of moving on to the next respective word of the closed-captioned text for comparison purposes if the prior word of the closed-captioned text is not matched with any of the plurality of words of the ASR text.

5. The method of claim 1 wherein, for any unmatched word in the closed captioned text, identifying the closest matched words in the closed captioned text on either side of the unmatched word along the timeline and then comparing the unmatched word with words of the ASR text between the two points on the timeline and selecting the most likely match or matches thereto.

6. The method of claim 1 wherein the step of comparing comprises matching strings of characters between the words of the closed-captioned text with the words of the ASR text to attempt to find exact or phonetically similar matches.

7. The method of claim 1 wherein the step of comparing comprises matching strings of characters between the words of the closed-captioned text with the words of the ASR text to attempt to find approximate matches based on the proximity of the respective points on the timeline of the respective words.

8. The method of claim 1 wherein N represents the number of words to be analyzed.

9. The method of claim 1 further comprising the step of creating a time-based metadata file that contains all of the correct words associated with the audio of the multimedia file and wherein each of the correct words is associated with the respective point in time along the timeline of the matched word from the ASR text corresponding therewith.

10. The method of claim 9 further comprising associating the time-based metadata file with the corresponding multimedia file.

11. A computer program product, comprising:
    a computer readable medium; and
    computer program instructions stored on the computer readable medium that, when processed by a computer, instruct the computer to perform a process of synchronizing text with audio in a multimedia file, wherein the multimedia file includes previously synchronized video and audio, wherein the multimedia file has a start time and a stop time that defines a timeline for the multimedia file, wherein the frames of the video and the corresponding audio are each associated with respective points in time along the timeline, the process comprising: receiving the multimedia file and parsing the audio therefrom, but maintaining the timeline synchronization between the video and the audio; receiving closed-captioned data associated with the multimedia file, wherein the closed-captioned data contains closed-captioned text, wherein each word of the closed-captioned text is associated with a corresponding word spoken in the audio, wherein each word of the closed-captioned text has a high degree of accuracy with the corresponding word spoken in the audio but a low correlation with the respective point in time along the timeline at which the corresponding word was spoken in the audio; using automated speech recognition (ASR) software, generating ASR text of the parsed audio, wherein each word of the ASR text is associated approximately with the corresponding words spoken in the audio, wherein each word of the ASR text has a lower degree of accuracy with the corresponding words spoken in the audio than the respective words of the closed-captioned text but a high correlation with the respective point in time along the timeline at which the corresponding word was spoken in the audio; thereafter, using N-gram analysis, comparing each word of the closed-captioned text with a plurality of words of the ASR text until a match is found; and for each matched word from the closed-captioned text, associating therewith the respective point in time along the timeline of the matched word from the ASR text corresponding therewith, whereby each closed-captioned word is associated with a respective point on the timeline corresponding to the same point in time on the timeline in which the word is actually spoken in the audio and occurs within the video.

12. The computer program product of claim 11 wherein the closed-captioned text and the ASR text represent only a portion of the audio of the multimedia file.

13. The computer program product of claim 11 wherein the closed-captioned text and the ASR text represent all of the audio of the multimedia file.

14. The computer program product of claim 11 wherein, within the process, the step of comparing each word of the closed-captioned text with a plurality of words of the ASR text until a match is found further comprises the step of moving on to the next respective word of the closed-captioned text for comparison purposes if the prior word of the closed-captioned text is not matched with any of the plurality of words of the ASR text.

15. The computer program product of claim 11 wherein, for any unmatched word in the closed captioned text, the process further comprises identifying the closest matched words in the closed captioned text on either side of the unmatched word along the timeline and then comparing the unmatched word with words of the ASR text between the two points on the timeline and selecting the most likely match or matches thereto.

16. The computer program product of claim 11 wherein, within the process, the step of comparing comprises matching strings of characters between the words of the closed-captioned text with the words of the ASR text to attempt to find exact or phonetically similar matches.

17. The computer program product of claim 11 wherein, within the process, the step of comparing comprises matching strings of characters between the words of the closed-captioned text with the words of the ASR text to attempt to find approximate matches based on the proximity of the respective points on the timeline of the respective words.

18. The computer program product of claim 11 wherein N represents the number of words to be analyzed by the process.

19. The computer program product of claim 11 wherein the process further comprises creating a time-based metadata file that contains all of the correct words associated with the audio of the multimedia file and wherein each of the correct words is associated with the respective point in time along the timeline of the matched word from the ASR text corresponding therewith.

20. The computer program product of claim 19 wherein the process further comprises associating the time-based metadata file with the corresponding multimedia file.

\* \* \* \* \*